United States Patent
Vojacek et al.

(10) Patent No.: US 8,251,853 B2
(45) Date of Patent: Aug. 28, 2012

(54) FRICTION GEAR

(76) Inventors: Herbert Vojacek, Gmund (DE);
Maximilian Simon, Olching (DE)

( * ) Notice: Subject to any disclaimer, the term of this patent is extended or adjusted under 35 U.S.C. 154(b) by 1056 days.

(21) Appl. No.: 12/278,721

(22) PCT Filed: Oct. 11, 2006

(86) PCT No.: PCT/EP2006/009793
§ 371 (c)(1),
(2), (4) Date: Aug. 7, 2008

(87) PCT Pub. No.: WO2007/042264
PCT Pub. Date: Apr. 19, 2007

(65) Prior Publication Data
US 2010/0120571 A1    May 13, 2010

(30) Foreign Application Priority Data

Oct. 14, 2005   (DE) .......................... 10 2005 049 173

(51) Int. Cl.
*F16H 55/18*   (2006.01)
*F16H 15/48*   (2006.01)
*F16H 13/14*   (2006.01)

(52) U.S. Cl. ........................................ 475/195; 475/194

(58) Field of Classification Search .......... 475/183–197; 74/409
See application file for complete search history.

(56) References Cited

U.S. PATENT DOCUMENTS

| | | | |
|---|---|---|---|
| 2,973,671 A * | 3/1961 | Elkins | 475/185 |
| 3,456,518 A | 7/1969 | Topouzian | |
| 4,483,216 A | 11/1984 | Takahashi et al. | |
| 4,618,049 A * | 10/1986 | Pflaum et al. | 192/107 M |
| 5,037,361 A * | 8/1991 | Takahashi | 475/195 |
| 5,238,459 A * | 8/1993 | Andre | 475/183 |
| 6,344,009 B1 | 2/2002 | Wirz | |

FOREIGN PATENT DOCUMENTS

| | | |
|---|---|---|
| CH | 173838 A | 12/1934 |
| DE | 19900010 A1 | 8/2000 |

\* cited by examiner

*Primary Examiner* — Tisha Lewis
(74) *Attorney, Agent, or Firm* — Laurence A. Greenberg; Werner H. Stemer; Ralph E. Locher

(57) ABSTRACT

A planetary friction gear is enabled to make it possible to transmit comparatively great torque densities while providing a very high degree of smoothness of operation, preventing the unwanted slip-stick behavior in friction gears. The inventive gear is particularly suitable for actuators used in the immediate vicinity of humans in everyday life.

10 Claims, 1 Drawing Sheet

FRICTION GEAR

BACKGROUND OF THE INVENTION

Field of the Invention

The invention relates to a friction gear for transmitting torque, having three rotating assemblies of sun wheel shaft, planet rolling body and outer hollow body, at least one of which is elastically deformable, and with the respective pairs of friction contact surfaces rolling against one another under a pressure force with punctiform contact or linear contact.

Gearings, friction gears and also gearwheel mechanisms are used for transmitting torque between shafts at different rotational speeds.

Gearwheel mechanisms, with a transmission of force or torque by means of teeth which engage into one another in a form-fitting manner, permit the transmission of comparatively large forces with high efficiency, but have several systemic disadvantages such as a greater level of noise the less precision is used in producing the individual mechanism parts, and the greater the forces actually being transmitted.

Friction gears with a force-fitting transmission of torque permit, for an equal amount of available space, the transmission of comparatively small torques and forces, which are limited by the maximum contact friction force or pressure force, as a circumferential force, which can be applied to the friction contact surface pairs of two assemblies. The utilizable friction forces are smaller by the factor of $\mu$ than the usable contact normal forces in the case of gearwheels which engage into one another. The utilizable friction value $\mu$ in lubricated friction gears is, from experience, a maximum of 0.07 even if synthetic traction fluids are used as transmission fluid. The power density, or the transmissible torque density, is accordingly relatively low for friction gears.

However, friction gears have the advantage over gearwheel mechanisms of substantial freedom from play between the assemblies, and therefore greater running smoothness.

The development of both gearing types is driven equally by the demands for more efficient, more cost-effective production, corresponding structural design for simple assembly and servicing, avoiding susceptibility to wear, improving operational reliability and increasing the transmissible torques corresponding to the installation space available in each case.

Said high demands can be advantageously met with planetary gear sets, as one of many gearing types. This applies both to embodiments as gearwheel mechanisms and also as friction gears, or else as a combination making simultaneous use of both types of force transmission.

Planetary gear sets are characterized in a known way in that, in them, generally at least two planet units or planet rolling bodies revolve around a sun wheel, or a sun wheel shaft, which is arranged centrally in the gearing, with only a single planet unit being used in rare cases. Here, the planet units are supported radially at the outside against an outer hollow wheel, or an outer hollow body, which surrounds said planet units, and at the inside against the sun wheel. Said reciprocal support serves to generate the contact pressure, which is imperative for torque transmission, between friction contact surface pairs, without the pressure forces loading the bearing in the case of more than one planet.

Friction gears with planet units are known in a wide range of variants, primarily with regard to the devices and the generation and possible control of the contact pressure or pressure forces. The majority of the known embodiments have balls as planet rolling bodies, which balls roll between correspondingly formed inner and outer raceways. The torque transmission thus takes place, on account of the design, via a punctiform area of contact. The transmissible torque density is correspondingly restricted, especially since mechanical, material-induced rolling fatigue of the contact partners involved occurs in the event of excessive contact pressure being applied in order to increase the transmissible torque density.

On the basis of this knowledge, the alternative measure was therefore proposed of designing planet friction gears with linear contact, instead of punctiform contact, in order to transmit higher torque densities via friction contact surfaces. For example, axially parallel rollers which roll against one another can be designed with linear contact and permit the transmission of comparatively high torque densities. Two methods inter alia have proven to be particularly effective for generating the necessary pressure force. On the one hand, barrel-shaped, bulged planet rolling bodies are mounted in a rigid outer hollow body which is split perpendicularly with respect to the rotational axis. The two body halves have a small spacing with respect to one another, which spacing is either fixedly set during assembly or is controlled as a function of torque. The necessary pressure forces are generated by means of a cone effect by applying controlled axial forces on the body halves. The elastic deformation of the surfaces on account of the pressure forces—Hertzian flattening—results in a parabolic pressure distribution over the flattening surface both in the circumferential direction and also transversely with respect thereto, and the maximum value is referred to as Hertzian stress. If the radii of curvature of the rolling partners correspond in size and alignment in the axial direction, a line of contact of the linear contact is generated in the longitudinal direction. Such known designs of planetary gear sets with linear contact, however, have the disadvantage of very different high Hertzian stresses at the sun wheel shaft and at the outer hollow body, with the differences increasing with increasing transmission ratio.

Devices and measures for significantly depleting said local differences in contact pressure are not known.

Another possibility for generating the necessary pressure forces between the contact partners is described for example in DE 199 00 010 A1. Said document relates to a play-free friction gear as per the preamble of the claim of the present invention. In said document, the necessary contact pressure is generated by inserting the sun wheel shaft together with the planet rolling bodies which revolve around it into an elastic outer hollow body of slightly smaller inner diameter than the mathematical envelope of the sun gear shaft and planet rolling bodies. One disadvantage is the uncontrolled linear contact which is generated at best only within small surface regions.

A disadvantage here, too, is the different Hertzian stresses generated at the different friction contact surfaces. The weakest link in the torque transmission chain in this regard, the friction contact surface between the planet rolling body and the outer hollow body, limits the maximum transmissible torques and restricts the transmissible torque density to unsatisfactorily low values. The explanation for this is that the friction value $\mu$ which can be utilized for the transmission of torque is lower at low Hertzian stresses than at high Hertzian stresses.

The smooth running specified as an advantage in said gearing applies only for comparatively low pressure forces and therefore only for low Hertzian stresses. An increase in the pressure forces in order to permit the transmission of greater torque densities results in an unwanted "stick-slip" behavior, a slipping of the friction contact surfaces which starts and stops at short intervals, which leads to undesirable vibrations in the gearing.

A further possibility for generating the pressure forces which are imperative for friction gears is described in CH 173 838. In said document, the pressure forces are applied between the friction contact surfaces by means of an axial spring-loading of individual components. In said document, for the targeted adjustment of the pressure forces, the sun wheel shaft and the planet rolling bodies are movable as a functional unit in the axial direction relative to the immovably rigid, inflexible conical outer wheel body. In the exemplary embodiments, the outer hollow body is, without exception, of conical design.

In gearings of said type, it is equally possible, in an uncontrolled fashion, for punctiform or linear contact to be present between the friction surface pair of sun wheel shaft and planet rolling body. Measures for a targeted adjustment of equivalent Hertzian stress and/or equivalent torque transmission in the different friction contact surface pairs are not provided in said document.

One disadvantage of said arrangement is also the requirement for special thrust bearings which absorb the pressure forces which build up at one side with the locking to the sun wheel shaft and planet roller body.

BRIEF SUMMARY OF THE INVENTION

It is therefore an object of the present application, for the known friction gear, to eliminate the above-described disadvantages and, while maintaining the known advantages such as high running smoothness, low backlash and low susceptibility to wear, to be able to transmit a high torque density which corresponds approximately to that which is possible with gearwheel mechanisms. It should be possible to produce a friction gear of said type cost-effectively and said friction gear should have high levels of functional and operational reliability. Said friction gear should be usable in the form of small motors with integrated gearings as adjusting drives wherever high demands are made on comfort, for example in motor vehicle construction.

According to the invention, said object is achieved, in the case of friction gears in that the friction contact surfaces of pairs of at least two assemblies which roll against one another have a transverse curvature perpendicular to the circumferential curvature, with the extent of the transverse curvature of at least one assembly being defined by the design itself and also by an elastic component deformation during the course of assembly of the gear, and being dimensioned so as to generate linear contact; in that the straight and/or the transversely curved contact line of at least one pair of friction contact surfaces which roll against one another has a spatial line alignment with respect to the axis of the sun wheel shaft which is such that a drilling/rolling ratio of 0.001 to 0.2 is generated; and in that the pressure forces between the individual friction contact surface pairs, with conventional utilization of the present mechanical rolling strength of the modular units and the present friction value $\mu$ of the friction contact surface pairs, result in at least approximately equal values for the maximum transmissible torque both between the sun wheel shaft and the sum of the planet rolling bodies and also between the sum of the planet rolling bodies and the outer hollow body.

The invention encompasses planetary friction gears of all sizes and is not restricted to individual technical embodiments. The preferred application is in the field of comfort drives for transmitting more medium and small torques while nevertheless providing high torque density. Such applications are for example in the field of actuating drives, in particular in the direct vicinity of persons. In said applications, the gearing according to the invention is preferably formed in the manner of an integrated assembly together with an electric motor. Here, a single-piece component will have both the functional features of a motor shaft and also those of a sun wheel shaft. Here, the sun wheel shaft is supported and mounted in the friction gear radially at all sides by means of the planet rolling bodies. Generally, only an additional radial motor shaft mounting arrangement is therefore required at the other shaft end.

The advantages of the friction gear result from the combination of the individual groups of features of the characterizing part of claim 1. Here, it falls within the knowledge of a person of average skill in the art to implement the instructions given therein.

The expressions in the wording of the claim, such as punctiform and linear contact, or else the expression "conventional use" (of the present rolling strength and friction value) have already been discussed in terms of their meaning for friction gears in the introductory part of this document. The expression "conventional use" is delimited from non-conventional use in terms of the limits for the stated material properties, in the event of the exceedance or undershooting of which faults in the gearing function, such as material fatigue, no longer tolerable friction losses, a sharp rise in transmission noise and slipping of the friction contact surfaces of one pair, occur in a known way.

A person of average skill in the art is familiar with the selection of the respective materials from the given available range for the required adaptation of component elasticity, pressure forces, rolling strength, friction value and size of the rolling surfaces corresponding to the given linear contact for the individual friction contact surfaces.

As well as assemblies with a mathematical cylinder shape, the expression "friction contact surface with a cylindrical basic shape" also encompasses shapes of friction contact surfaces in which the cylinder surface has for example annular grooves or deviations from the cylindrical shape in sections, such as convexities, barrel shapes and end recesses in only small edge regions of the friction contact surface. The friction contact surface of an assembly also has a cylindrical basic shape if, for said assembly, a movement in its axial direction, specifically relative to the further assembly which rolls on its friction contact surface, takes place without a change in pressure.

A person skilled in the art knows to make suitable allowance for the influence of elastic deformation, as a result of external forces acting on the elastic assemblies, in the geometric component shape which must be determined mathematically and in the required transverse curvature of the respective friction contact surface. He is familiar with the fact that an excessively low level of elasticity in one component permits only a very restricted change in shape under the influence of externally applied forces, in particular also not within small, locally adjoining surface regions of the friction contact surfaces. In these cases, a desired uniform pressure distribution between friction contact surfaces cannot be obtained, or can be obtained only to a limited extent, as a result of elastic deformation.

In order to achieve a uniform pressure distribution while simultaneously fulfilling the further features of the claim, when using materials with low elasticity, correspondingly more precise component production would be necessary, which itself must be equated with higher production costs.

To obtain the desired elasticity by means of the material, for example by using an elastomer, is at best possible only to an insufficient extent on account of the low rolling strength of materials of said type at high torque densities, which requires high pressure forces.

It was entirely unexpected, and not suggested by the known prior art, that it is possible by designing the friction surface pairs which roll on one another with surfaces which are transversely curved in relation to the component axis and/or are conical, and with a drilling/rolling ratio of 0.001 to 0.2, to eliminate the "stick-slip" behavior which is undesirable in friction gears, without considerably increasing the friction losses additionally caused by the drilling movement. No vibrations occur in the gearing. The result is a very high level of running smoothness. Said feature of the solution according to the invention is given additional weight by measures for compensating the drilling forces which unavoidably act in the axial direction by means other than shaft end bearings which absorb the axial forces and which significantly increase production costs. The stick-slip-preventing effect is obtained even with the smallest drilling-rolling ratios of 0.001-0.2, for example by means of conical planet rolling bodies. The low axial forces which are generated here can be compensated, without significant additional friction losses, merely by dividing the friction contact surfaces in two in a mirror-symmetrical arrangement, with the mirror plane running perpendicularly with respect to the axis of the sun wheel shaft.

A surprising advantage of friction gears according to the invention is also the high torque transmission density which can be obtained and which is comparable with average torque densities of gearwheel mechanisms. Decisive for this is the use of uniformly high pressure forces for all friction contact surface pairs, without premature rolling fatigue occurring in individual surface regions with linear contact as a result of excessively high Hertzian stresses during the transmission of torque.

Equally responsible for this are the geometric design according to the invention of the gearing in order to obtain a high degree of linear contact, primarily in the load-critical contact region between the sun wheel shaft and planet rolling bodies, yet also the attainment of equal Hertzian stresses in the outer hollow body/planet rolling body friction contact surface pair, each being imperative for the transmission of equal torques in each friction contact surface pair, or in other words, the transmissible torque density thus reaches its maximum.

Finally, high torque densities can only be reached by means of surfaces with favorable surface conditions and a high friction value $\mu$ By providing and introducing suitable lubricants as a traction aid in the form of synthetic traction oils or greases, it is possible to obtain friction values $\mu$ of 0.04-0.07. According to a refinement of the invention, the friction contact surfaces are lubricated with traction lubricants and the friction value $\mu$ is greater than 0.045. Non-lubricated friction contact surfaces, in contrast, have friction values which are higher by a factor of 5-10, but have the known disadvantages such as low transmission comfort and increased running noise. According to a refinement of the invention, the friction contact surfaces are substantially not lubricated and the friction value $\mu$ is greater than 0.35.

Some advantageous refinements of the invention are described in more detail in FIGS. 1-4.

The figures each show the design and arrangement of the sun wheel shaft, planet rolling bodies and outer hollow wheel in a friction gear in a section through its central longitudinal axis.

DESCRIPTION OF THE INVENTION

Figure 1:
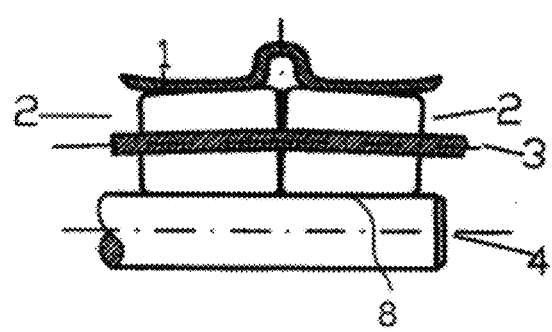
FIGS. 1-4 show the outer hollow body (1) and the planet rolling body or bodies (2) and the planet carrier which surrounds the shaft (3) of the planet rolling bodies in the manner of a cage (cage not visible in sectioned illustration). Formed in the center of the rotationally symmetrical friction gear is the sun wheel shaft (4) via which the torque to be transmitted is input.

FIG. 1 relates to an arrangement in which the sun wheel shaft has a friction contact surface (8) with a cylindrical basic shape and in which in each case pairs of mirror-symmetrical and therefore two-part planet rolling bodies are formed such that the axial forces which inevitably occur as a result of the drilling/rolling ratio are completely compensated without it being necessary to provide shaft end bearings for this purpose. The torque to be transmitted is introduced via the sun wheel shaft and is output via a planet carrier which surrounds the planet rolling bodies in the manner of a cage and which has a shaft.

Figure 2:
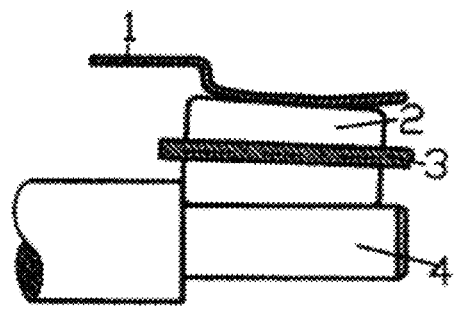

FIG. 2 relates to a similar design to FIG. 1, with the only difference being that no pair of mirror-symmetrically arranged planet rolling bodies is provided here but rather only the half-body is formed on one side of the mirror plane, and that the axial force generated on the half-body is absorbed by means of a shoulder on the sun wheel shaft. As discussed further above, the only small axial forces also permit this embodiment without causing significant friction losses. In FIGS. 1 and 2, it is possible by means of a correspondingly shaped, thin-walled outer hollow body to obtain that a similar ratio of Hertzian stress (rolling strength) permissible for strength reasons to the actual Hertzian stress is present in the contact region between the outer hollow body and planet rolling body and also in the contact region between the planet rolling body and sun wheel shaft.

Figure 3:
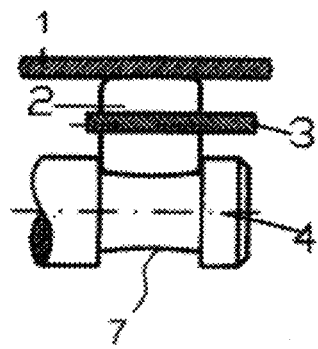

FIG. 3 relates to an arrangement in which the outer 33 hollow body has a friction contact surface which is of 34 cylindrical basic shape and in which the planet rolling 35 bodies are barrel-shaped and the sun wheel shaft is 36 matched in terms of its transverse curvature (7) to the 37 planet rolling bodies.

The torque which is introduced via the sun wheel shaft is output via the shaft of the planet carrier which surrounds the planet rolling bodies.

Figure 4:
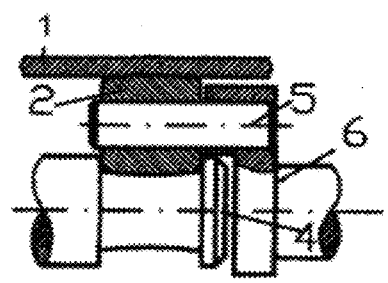

In FIG. 3 and FIG. 4, it is provided firstly, by means of the design of the planet rolling bodies, that the desired drilling/rolling conditions for preventing stick-slip are generated, and secondly, by means of the matching of the transverse curvature of the sun to the planets, that similar ratios of permissible Hertzian stress (rolling strength) to the present Hertzian stress to those in the region of contact between the planets and hollow wheel prevail in the region of contact between the sun and planets. At the same time, the elasticity of the thin-walled hollow wheel is utilized to set the desired pressure relationship between the regions of engagement between the planet and hollow wheel and between the planet and sun.

FIG. 4 also shows a different design of the planet carrier for the guidance of the planets and for the take-off of the torque. The planet rolling bodies (2) are guided on pins (5) which are fixedly connected to the axially parallel shaft (6).

The invention claimed is:
1. A friction gear for transmitting torque, comprising:
three rotating construction units including a sun wheel shaft, one or more planetary rolling bodies, and an outer hollow body;
at least one of said three rotating construction units being elastically deformable;

said rotating construction units being disposed to define respective pairs of friction contact surfaces rolling against one another under a pressure force with punctiform contact or linear contact, said friction contact surfaces of pairs of at least two said rotating construction units that roll against one another having a transverse curvature perpendicular to a circumferential curvature thereof, with an extent of said transverse curvature of at least one of said construction units being defined by a design contour thereof and also by an elastic component deformation upon assembly of the friction gear and being dimensioned to generate linear contact;

wherein a straight and/or a transversely curved contact line of at least one pair of friction contact surfaces rolling against one another has a spatial line alignment with respect to an axis of said sun wheel shaft to generate a drilling/rolling ratio of 0.001 to 0.2; and wherein pressure forces between the individual said friction contact surface pairs, with conventional utilization of the mechanical rolling strength of the construction units and a friction value μ of the friction contact surface pairs, result in substantially equal values for a maximally transmissible torque both between said sun wheel shaft and a sum of said planetary rolling bodies and also between the sum of said planetary rolling bodies and said outer hollow body.

2. The friction gear according to claim 1, wherein the drilling/rolling ratio is 0.01 to 0.05.

3. The friction gear according to claim 1, which further comprises a bearing device for compensating for axial drilling forces defined by the drilling/rolling ratio.

4. The friction gear according to claim 3, wherein said outer hollow body and said planetary rolling body are formed to define friction contact surfaces disposed mirror-symmetrically with respect to a plane perpendicular to an axis of said sun wheel shaft.

5. The friction gear according to claim 4, wherein said mirror-symmetrical friction contact surfaces, each assigned to one of said three construction units, are formed on spatially separate bodies.

6. The friction gear according to claim 1, wherein said sun wheel shaft or said outer hollow body has a friction contact surface with a cylindrical basic shape.

7. The friction gear according to claim 1, wherein said sun wheel shaft has a cylindrical contact surface and said one or more planetary rolling bodies have conical friction contact surfaces.

8. The friction gear according to claim 7, wherein said planetary rolling bodies are rotatable about an axis inclined with respect to an axis of said sun wheel shaft.

9. The friction gear according to claim 1, wherein said planetary rolling bodies are formed in a planet carrier outputting a torque and defining a cage surrounding said planetary rolling bodies.

10. The friction gear according to claim 1, wherein said sun wheel shaft is a motor shaft of an electric motor, and said friction gear serves as a motor shaft mount.

* * * * *